US007062473B1

(12) United States Patent
Taylor

(10) Patent No.: US 7,062,473 B1
(45) Date of Patent: Jun. 13, 2006

(54) METHOD AND PROCESS FOR PROVIDING POSTAL DISCOUNTING

(75) Inventor: Gerald L. Taylor, Plainfield, IL (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/468,470

(22) Filed: Dec. 21, 1999

(51) Int. Cl.
*G06F 17/60* (2006.01)

(52) U.S. Cl. ...................... 705/402; 705/401; 705/406; 705/404; 705/403

(58) Field of Classification Search .................. 705/60, 705/402, 401, 406, 404, 403
See application file for complete search history.

(56) References Cited

U.S. PATENT DOCUMENTS 5,051,914 A * 9/1991 Sansone et al. ............. 364/478
5,068,797 A * 11/1991 Sansone et al. ............. 364/478
5,079,714 A * 1/1992 Manduley et al. ........... 364/478
5,420,403 A * 5/1995 Allum et al. ................ 235/375
5,673,193 A * 9/1997 Brust et al. ................. 364/464

FOREIGN PATENT DOCUMENTS

DE 19720053 A1 * 5/1997

OTHER PUBLICATIONS

Rediscovering parcel post; catalog eg; New Canaan; Aug. 1998; Paul Miller.*
The Most important element in any mailing. Direct Marketing; Garden City; Jul. 1998; Jeffery Dokins.*

* cited by examiner

*Primary Examiner*—John W. Hayes
*Assistant Examiner*—Akiba Robinson-Boyce
(74) *Attorney, Agent, or Firm*—Ronald Reichman; Angelo N. Chaclas

(57) ABSTRACT

A method to allow a mailer to receive postal discounts for mailing at an eligible postal facility a plurality of mail pieces to a plurality of mailing addresses. The method comprises the steps of creating an entry code lookup file containing a plurality of identification codes for each eligible postal facility according to the Destination Delivery Unit (DDU) rate or discounting and a drop ship file containing a plurality of local ZIP codes and carrier routes associated with each eligible postal facility. When a mailer enters the identification code for the eligible postal facility where the mailer drops the mail for mailing, the drop ship file is used to determine whether the mail piece is available for DDU discounts based on the local ZIP code and the carrier route.

2 Claims, 3 Drawing Sheets

METHOD AND PROCESS FOR PROVIDING POSTAL DISCOUNTING

TECHNICAL FIELD

The present invention relates generally to postal services and, in particular, to a discount rate available to Periodicals and Standard Mail (A) that is properly prepared and entered at an eligible United States Postal Service (USPS) entry point. This discount rate is known as the Destination Delivery Unit (DDU) rate.

BACKGROUND OF THE INVENTION

Most companies throughout the United States use the services of the United States Postal Service (USPS) to communicate with their customers. These companies use the USPS to deliver monthly bills, monthly statements, annual reports for shareholders, catalogs for holiday shopping, newspapers, monthly magazine subscriptions, and Standard Mail (A) direct mail.

The cost associated with moving mail from the sender to the recipient is related primarily to the manual effort involved. The mail must go through several sorting processes and eventually be sorted down to the carrier delivering the mail. Once the mail is sorted down to the actual mail carrier, the carrier must manually sort the mail into the sequence that matches the route that he/she walks or drives. This is a very expensive, labor-intensive process. Carriers spend approximately fifty percent (50%) of their time manually sorting mail.

The USPS has spent billions of dollars to automate this process. The intent of automation is to process the mail faster while minimizing costs. To minimize costs, automated equipment has been manufactured and data processing methods have been implemented. The data processing methods were created so that the mailers themselves could perform certain tasks that would make it easier for the USPS to process the mail. The USPS passes the labor savings on to any mailer who shares in the work in the form of postage discounts. This is known as "work sharing." There are a number of tasks that a mailer can perform to obtain work sharing discounts. The more work the mailer performs, the greater the discounts.

The oldest work sharing program is carrier route sorting. Mailers match their name and address mailing file to the USPS postal data and assign carrier route codes. Every ZIP code and/or city is broken up into carrier routes. Each route represents one mail carrier. The USPS assigns each carrier a carrier number. This number is the carrier route code.

The Domestic Mail Manual (DMM) published by the United States Postal Service describes various methods for presorting to accommodate the different classes and mail piece characteristics. In particular, a discount is available for mailing Periodicals and Standard Mail (A) if the mail is properly prepared and entered by the mailer at an eligible USPS entry postal facility that serves the delivery address on the mail. This discount category is referred to as Destination Delivery Unit (DDU) rate or discounting.

In order to take advantage of DDU discounts, the mailer must determine the eligible USPS entry postal facilities and their ZIP codes and identify all the local ZIP codes of the delivery addresses being served by each eligible USPS entry postal facility. When mailing, the mailer must code in the three-digit ZIP code prefix or the five-digit code for the entry postal facility, and then code in a parameter to specifying all the local ZIP codes that are served by the entry postal facility and eligible for the DDU rate. For example, for the eligible entry postal facility at Aurora, Ill., the five-digit code is 60506, while the three-digit ZIP code prefix is 605.

The USPS Address Information System presently puts out a number of products to help mailers who wish to take advantage of DDU discounts. The products relevant for DDU discounts are the USPS Drop Ship Address File and the USPS Drop Ship ZIP Carrier Route File, which are part of the USPS Drop Ship Product. The USPS Drop Ship Address File contains the USPS facility address and telephone information, and a drop site key for linking the entry postal facility address to the ZIP code of the delivery address. The USPS Drop Ship ZIP Carrier Route File contains ZIP codes, carrier routes and other discount codes. It also contains a drop site letter key and a drop site other key or additional discounts. The keys are pointers for connecting the USPS Drop Ship Address File to the USPS Drop Ship ZIP Carrier Route File.

Identifying all the local ZIP codes for an entry point that are eligible for the DDU rate and manually coding in the parameter to identify these ZIP codes is time-consuming and subject to errors. Furthermore, the USPS updates the Drop Ship Address File and the Drop Ship ZIP Carrier Route File monthly. In order to incorporate the ZIP code changes to comply with USPS monthly updates, the mailer has to verify the list of ZIP codes associated with each eligible entry point every time the mailer runs the mailing.

It is advantageous and desirable to provide a method of providing postal discounting to a mailer in accordance with the DDU discounts without requiring the mailer to look up and verify the local ZIP codes for all the relevant eligible entry points and code the required parameters to specify the local ZIP codes.

SUMMARY OF THE INVENTION

The method, according to the present invention, allows a mailer to receive postal discounts for mailing a plurality of mail pieces to a plurality of mailing addresses at a postal entry point, wherein the postal discounts are provided in accordance with the USPS Destination Delivery Unit (DDU) rates or discounts for mailing Periodicals, Standard Mail (A) and Standard Mail (B) at a plurality of eligible USPS postal facilities. Each of the eligible USPS postal facilities is associated with a plurality of local ZIP codes and carrier routes. The method comprises the steps of: a) creating an entry point lookup file containing a plurality of identification codes, each of which identifies one eligible USPS postal facility so as to allow the mailer to use one of the identification codes to identify the postal entry point where the mailer drops off the mail for mailing, b) creating a drop ship index file containing a plurality of local ZIP codes and carrier routes associated with each eligible USPS postal facility; and c) checking the mailing address of each mail piece in order to verify whether the mailing address is contained in the plurality of local ZIP codes and carrier routes associated with said postal entry point.

The method, according to the present invention, uses the USPS Drop Ship Address file to create the entry point lookup file and the USPS Drop Ship ZIP Carrier Route File to create the drop ship index file.

Preferably, the identification code is a nine-digit code. With the method according to the present invention, all the mailer has to do is code a special parameter with the nine-digit identification code for the postal entry point. For example, the special parameter is called SPLTENTRY which is used to prompt the user to enter the identification code.

The process of creating the entry point lookup file and the drop ship index file comprises the steps of: a) providing a USPS Drop Ship Address File; b) retrieving the USPS facility addresses contained in the USPS Drop Ship Address File; c) creating a nine-digit identification code for each of said USPS facility addresses; d) sorting the identification codes by the drop site key; e) providing a USPS Drop Ship ZIP Carrier Route File; f) retrieving the local ZIP codes, carrier routes and other discount codes from the USPS Drop Ship ZIP Carrier Route File; g) sorting the local ZIP codes, carrier routes and other discount codes by the drop site letter key; and h) merging the identification codes with the local ZIP codes, carrier routes and other discount codes, wherein when a mailer codes the SPLTENTRY parameter with an identification code for a postal entry point, the local ZIP codes, carrier routes and other discount codes associated with the postal entry point are extracted in accordance with the drop site key, the drop site letter key and the drop site other key, thereby determining the availability of the DDU discounts for the mailing address on each mail piece.

It is possible that the process of creating the entry point lookup file and the drop ship index file further comprises the steps of: i) checking the accuracy of the USPS facility addresses retrieved from the USPS Drop Ship Address File; j) sorting the identification codes according to the state, city and street of the corresponding USPS facility addresses retrieved from the USPS Drop Ship Address File; k) eliminating duplicates in the identification codes, and l) extracting from the USPS Drop Ship ZIP Carrier Route File the records having a discount type equal to D which represents USPS Drop Ship Discounts.

DETAILED DESCRIPTION

Figure 1:
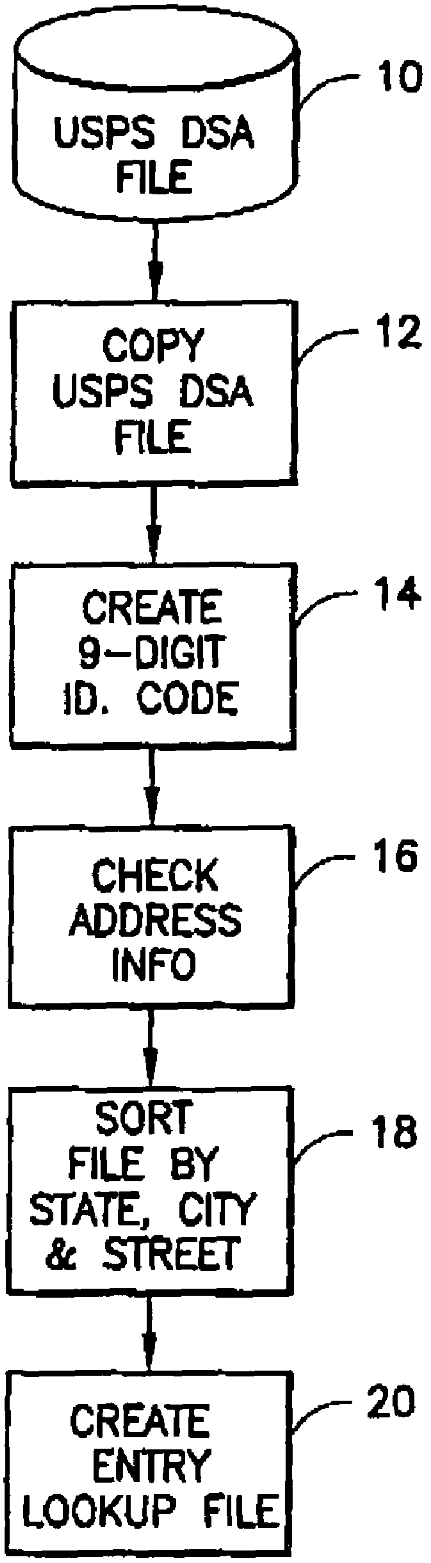
FIG. 1 is a flow chart describing the process for creating the entry point lookup file.

As shown in FIG. 1, the process for creating an entry point lookup file starts at block 10 by providing to a data processing device a USPS Drop Ship Address File which contains the USPS facility address and telephone information, and a drop site key for linking the entry postal facility address to the ZIP code of the delivery address. Typically, the data processing device is a computer which contains a data storage device, such as a hard-drive. At block 12, the contents of the USPS Drop Ship Address File is retrieved and copied to the storage device of the computer. A plurality of nine-digit identification codes are generated from the USPS facility addresses in the USPS Drop Ship Address File at block 14. Each of the identification codes is equivalent to the three-digit ZIP code prefix or the five-digit ZIP code for the entry postal facility or entry point. Each of the USPS facility addresses is checked to make sure that it is accurate, as shown at block 16. The nine-digit identification code can be a ZIP+4 code or an internally developed unique identification code if a valid ZIP+4 code does not exist for the postal facility. At block 18, the nine-digit identification codes are sorted by state, city and street of the USPS facility addresses. At block 20, an entry point lookup file is created from the sorted identification codes. With such a sorting, the mailer can easily look for the address of an eligible USPS postal facility by following the sequential listing of the state, the city and the street in the entry point lookup file, and obtain the nine-digit identification code for that postal facility. The mailer can receive the DDU rate or discounting only when the mailer drops the mail at an eligible USPS postal facility. The mailer must use this unique nine-digit identification code to code with the SPLTENTRY parameter to identify the drop-off postal facility.

Figure 2:
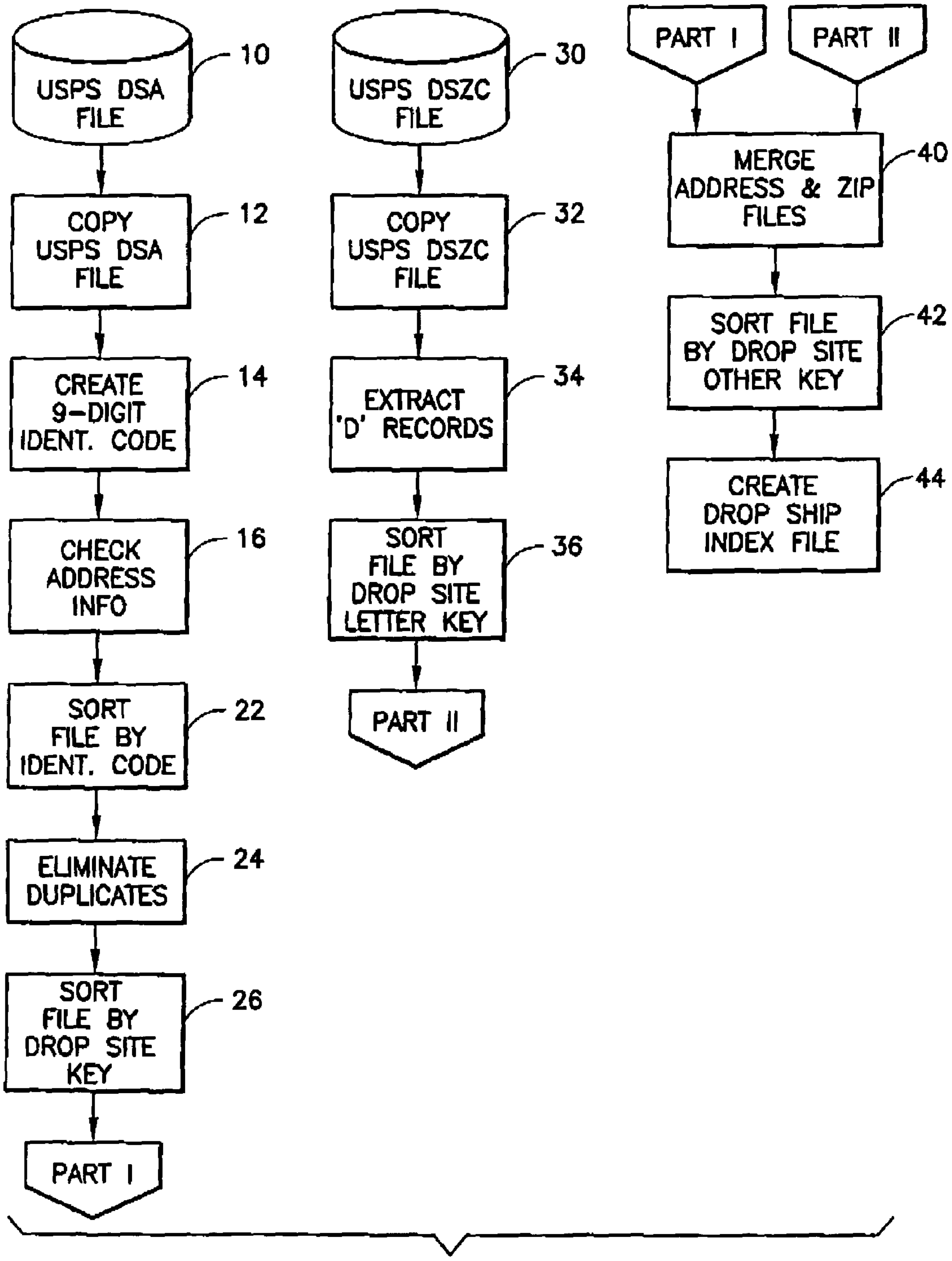
FIG. 2 is a flow chart describing the process for creating the drop ship index file.

As shown in FIG. 2, the process for creating a drop ship index file also starts with the USPS Drop Ship Address File, as shown at block 10. The same process steps are used to generate a plurality of nine-digit codes and verify the address of the USPS facilities, as shown at block 12 through block 16. But now the nine-digit identification codes are sorted according to the ZIP codes of the eligible USPS postal facilities as shown at block 22. The purpose of such sorting is to make sure there are no two or more duplicate identification codes pointing to the same postal facility. The duplicates of the identification codes (not the postal facilities), if they exist, are eliminated at block 24. At block 26, the nine-digit identification codes are sorted in accordance with the drop site key associated with the USPS facility addresses as provided in the USPS Drop Ship Address File. The above-described steps are used to complete PART I of the process.

In PART II of the process, a USPS Drop Ship ZIP Carrier Route is provided separately to the data processing device, as shown at block 30. At block 32, the local ZIP codes, carrier routes and other discount codes associated with each eligible USPS facility contained in the USPS Drop Ship ZIP Carrier Route File are retrieved and stored in the data storage device. Among the local ZIP codes and carrier routes, only those relevant to the DDU discounts are extracted, at block 34, and sorted by the drop site letter key, as shown at block 36.

At block 40, the sorted local ZIP codes and carrier routes from the USPS Drop Ship ZIP Carrier Route File are merged with the identification codes that are sorted in accordance with the drop site key associated with the USPS facility addresses as provided in the USPS Drop Ship Address File. Additionally, the merged files are sorted by the drop ship other key provided in the USPS Drop Ship ZIP Carrier Route File, as shown at block 42. With these sorted files, a drop ship index file is created, as shown at block 44.

Figure 3:
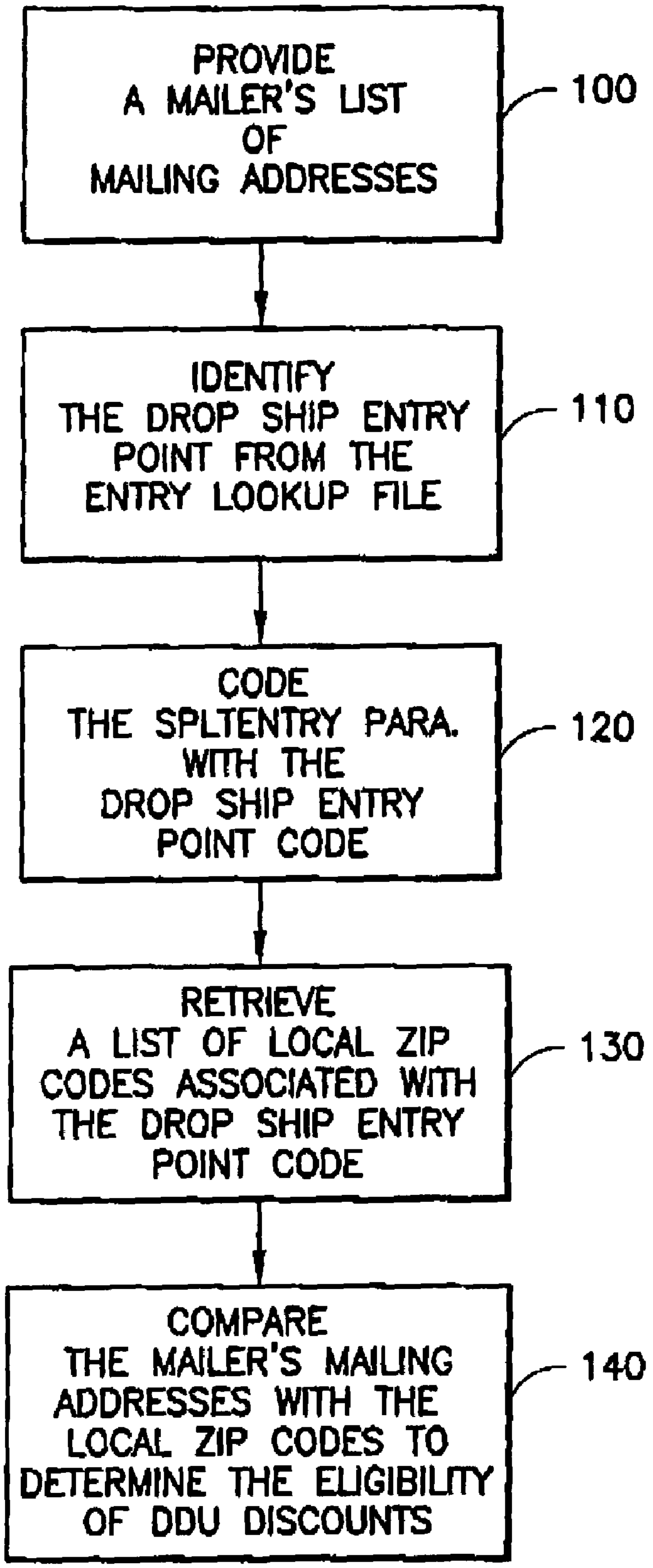
FIG. 3 is a flow chart describing the method of using the identification code in order to receive the DDU discounts.

FIG. 3 shows the procedure flow of using the identification code by a mailer in order to receive the DDU discounts. To take advantage of the present invention, the mailer provides a list of mailing addresses for mailing, as shown at block 100. From the entry point lookup file, which sequentially lists the addresses of the USPS entry postal facilities eligible for DDU discounts, as shown at block 110, the mailer finds the identification code for the Post Office which he/she wants to drop ship to in order to obtain DDU discounts and the associated identification code, and the mailer codes the SPLTENTRY parameter with the nine-digit identification code, as shown at block 120. According to the entered identification code, the carrier route and ZIP code for each of the mailing addresses found in the drop ship index file is retrieved, as shown at block 130. Each of the retrieve carrier routes and ZIP codes is then checked to determine whether a DDU rate is applicable. If the DDU rate is applicable, the postal facility, which is equal to what the user specified via the unique nine-digit identification, is checked to determine whether it is associated with the carrier route that was found. If the carrier route is indeed associated with the postal facility chosen by the user for DDU, a DDU discount is given, as shown at block 140.

Thus, what has been described is a method for providing postal discounts to a mailer who drops off mail pieces at an eligible USPS postal facility, wherein the discounts are provided in accordance with the USPS Destination Delivery Unit (DDU) rate or discounting for mailing Periodicals and Standard Mail. Although the invention has been described with respect to a preferred version thereof, it will be understood by those skilled in the art that the foregoing and various other changes, omissions and deviations in the form and detail thereof may be made without departing from the spirit and scope of this invention.

What is claimed is:

1. A process of creating a drop ship index file so as to allow a mailer to receive postal discounts for mailing at an eligible USPS postal facility a plurality of mail pieces to a plurality of mailing addresses, wherein the postal discounts are provided in accordance with USPS Destination Delivery Unit (DDU) rate or discounting for mailing Periodicals and Standard Mail at a plurality of eligible USPS postal facilities, wherein the drop ship index file contains a plurality of local ZIP codes and carrier routes associated with each eligible USPS postal facility, said process comprising the steps of:

a) providing a USPS Drop Ship Address File, which contains a plurality of addresses of the eligible USPS postal facilities and a drop site key;

b) retrieving the addresses of the eligible USPS postal facilities, wherein each address contains a ZIP code;

c) sorting the retrieved addresses of the eligible USPS postal facilities by the drop site key;

d) providing a USPS Drop Ship ZIP Carrier Route File which contains a plurality of local ZIP codes and carrier routes associated with the eligible DDU USPS postal facilities, a drop site letter key, and a drop site other key;

e) retrieving from the USPS Drop Ship ZIP Carrier Route File the plurality of local ZIP codes and carrier routes eligible for DDU discounting, the drop site letter key, and the drop site other key;

f) sorting the retrieved local ZIP codes and carrier routes by the drop site letter key;

g) merging the retrieved addresses of the eligible USPS postal facilities as sorted in step (c) and the retrieved local ZIP codes and carrier routes as sorted in step (d);

h) sorting the merged addresses and ZIP codes/carrier routes by the drop site other key;

i) creating a plurality of identification codes, each for one retrieved address of the eligible USPS postal facilities so that when the mailer uses an identification code to identify the eligible USPS postal facility where the mailer drops off the mail pieces for mailing, the local ZIP codes and carrier routes associated with said eligible USPS postal facility are used to check against each of the mailing addresses to determine whether said mailing address are available for DDU discounting.

2. The process of claim 1 further comprising the steps of eliminating duplicates in the identification codes, wherein two or more duplicate identification codes identify the same eligible USPS postal facility.

* * * * *